United States Patent

[11] 3,588,812

| [72] | Inventors | Richard A. Wheelock<br>4535 Orchard Av., San Diego, Calif. 92107;<br>Elmer C. Evans, P.O. Box 523, Elizabeth, N.C. 27909 |
|---|---|---|
| [21] | Appl No | 593,476 |
| [22] | Filed | Nov. 10, 1966 |
| [45] | Patented | June 28, 1971 |

[54] VEHICLE TURN SIGNAL
8 Claims, 2 Drawing Figs.

[52] U.S. Cl. .................................................. 340/55, 340/73
[51] Int. Cl. ................................................... B60q 1/34
[50] Field of Search .................................. 340/55, 67, 73

[56] References Cited
UNITED STATES PATENTS

| 2,589,410 | 3/1952 | Leete | 340/55 |
| 2,845,608 | 7/1958 | Short | 340/55 |
| 2,659,838 | 11/1953 | Du Rocher | 340/55 |
| 3,333,241 | 7/1967 | Peterson | 340/55 |

*Primary Examiner*—John W. Caldwell
*Assistant Examiner*—Howard S. Cohen
*Attorney*—Fulwider, Patton, Rieber, Lee and Utecht ABSTRACT: A vehicle turn signal system which uses four relays to sequentially energize the actuating, holding, illuminating, and cancelling circuits, and a steering column cancelling switch to effect cancellation of the turn indication.

Patented June 28, 1971

3,588,812

INVENTORS
RICHARD A. WHEELOCK
ELMER C. EVANS

BY

ATTORNEYS

VEHICLE TURN SIGNAL

The present invention relates to a turn signal system for use on vehicles such as automobiles, busses, trucks and floating vehicles.

The present invention is a simplification and improvement over such systems as that shown in the U.S. Pat. No. 2,589,410, issued Mar. 8, 1952, to Leete, U.S. Pat. No. 2,037,863, issued Apr. 21, 1936 to Matha and U.S. Pat. No. 3,757,315, issued July 31, 1956 to Hollins.

In carrying out the present invention we employ a turn signal switch which can be moved from a circuit open position to either of two positions for closing either of two electromagnetic coils. When the driver of the vehicle anticipates negotiating a curve to the right, he will move the switch to close a circuit to one of the coils and when he anticipates negotiating a turn to the left, he actuates the switch to energize the other coil. Energization of either of the coils causes signal lamps to be energized. Flashers are employed for causing blinking of the lamps. A common conductor is connected with the source of electric energy and in the lamp circuit and this common conductor is provided with a switch, which is normally maintained in the closed position. An electromagnet is adapted, when energized, to open the switch in the common conductor and this latter mentioned electromagnet is rendered effective when the steering wheel of the vehicle is returned to a position in which the vehicle is again moving in a straight line, that is, after the steering wheel has been returned to a nonnegotiating curve position. In this manner, the lamp switches indicating the turns, are disconnected from the circuit automatically after the return is negotiated.

Also, we provide for flashing or blinking both lamps as a warning while the vehicle is parked in a hazardous area.

Other features and the advantages of the present invention will be apparent from the following description, reference being had to the accompanying drawing wherein a preferred embodiment of the invention is illustrated.

IN THE DRAWING

Figure 1:
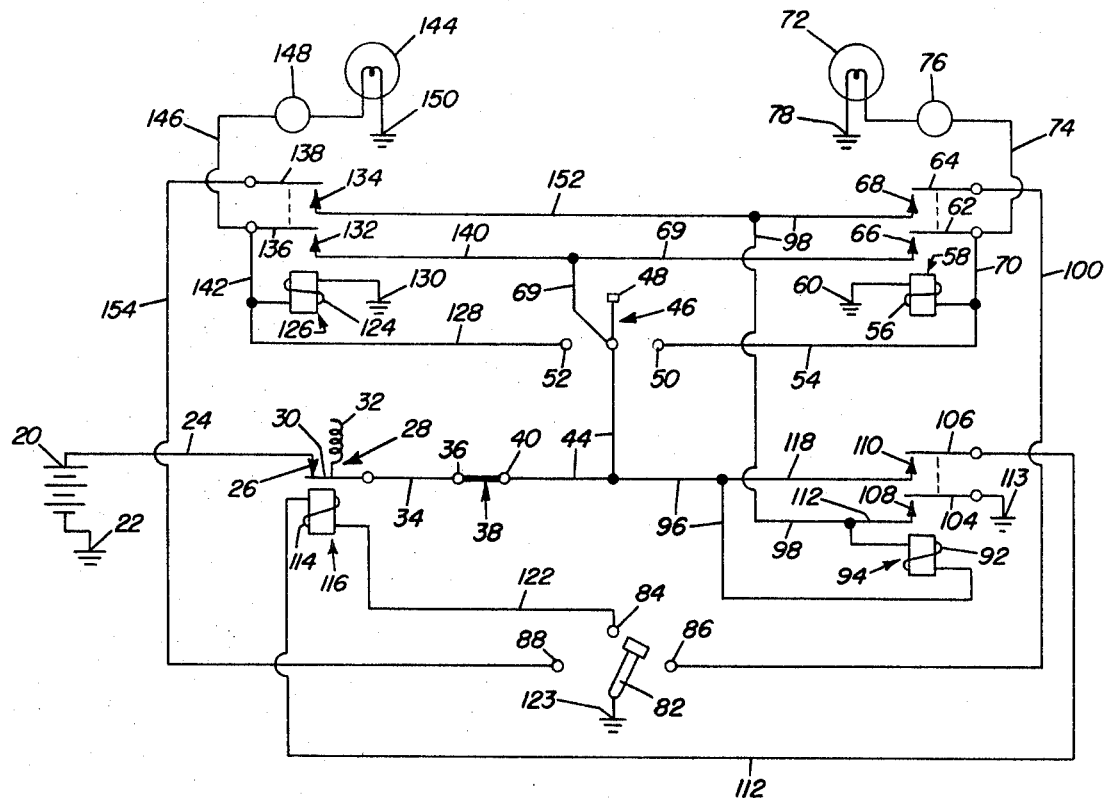
FIG. 1 is a wiring diagram of the system.

Referring more in detail to the drawing, a battery 20 is grounded as at 22. One end of a wire 24 is connected to the positive side of the battery and the opposite end terminates in a stationary contact 26 of a switch 28. This switch includes a movable contact 30 which is normally biased into engagement with contact 26 and the biasing element is herein shown as a spring 32. One end of the wire 34 is connected to the movable contact 30 and the other end is connected to a movable switch contact 36 of a switch 38. Switch 38 also includes a stationary contact 40. Switch 38 is normally closed. One end of a wire 44 is connected to the contact 40 and the opposite end is connected to a spring loaded turn switch 46 including a movable contact 48 and two stationary contacts 50 and 52. This movable contact is biased toward open circuit position by a spring (not shown). One end of a wire 54 is connected to the stationary contact 50 and the opposite end is connected to an electromagnetic coil 56 of a controller 58. The opposite end of the coil 56 is grounded as at 60.

When the driver of the vehicle anticipates a right turn, he will move the movable spring loaded turn switch contact 48 into contact with stationary contact 50 to thereby establish the circuit to coil 56 of the controller 58 which is traced as follows: battery 20, wire 24, switch 28, wire 34, switch 38, wire 44, contacts 48 and 50, wire 54, coil 56 to ground connection 60. Upon establishing this circuit, switch means are closed. These switch means include movable contacts 62 and 64, which, when moved by the electromagnetic coil 56, are brought into contact with the contacts 66 and 68, respectively. These switch means are normally biased to open position by any suitable means. When contact 62 engages contact 66, a holding circuit is completed to coil 56 as follows: battery 20, wire 24, switch 28, wire 34, switch 38, wires 44 and 69, contacts 66 and 62, wire 70, and coil 56 to ground connection 60. At this time, the spring loaded switch 48 can be returned automatically to its neutral position as shown in the drawing.

The closing of contact 62 onto contact 66 closes a circuit to a series of lamps, only one lamp being shown at 72. This series of lamps would include one at the front and right side of the vehicle, one at the rear and right side of the vehicle and a pilot light which would be visible to the driver. The lamp circuit includes the battery 20, wire 24, switch 28, wire 34, switch 38, wires 44 and 69, contacts 66 and 62, wire 74, a flasher 76 and ground connection 78. Thus, by reason of the flasher 76, flashing or blinking will occur at the lamps 72. The lamps will continue to flash as long as the electromagnetic switch coil 56 is energized. When the circuit through the coil 56 is interrupted, by opening either of the switches 28 or 38, contact 62 will be moved away from contact 67, since it is biased toward open position. Upon deenergization of coil 56, the circuit to the lamps 72 will be interrupted.

Figure 2:
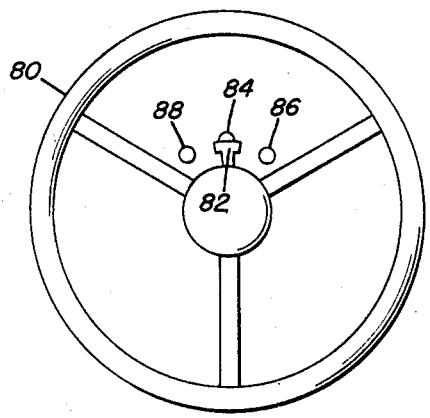
FIG. 2 is a view showing the steering wheel and diagrammatically showing switching mechanism controlled by the steering wheel.

Referring particularly to FIG. 2, it will be seen that the steering wheel 80 is provided with a fixed contact 82 which is oscillated with the steering wheel. This contact 82 is adapted to engage a stationary contact 84 when the vehicle is moving in a substantially straight line. When a right turn is being negotiated, this movable contact 82 is arranged to move away from the fixed contact 84 and engage a stationary contact 86, and when a left turn is being negotiated, this movable contact 82 is adapted to move away from the fixed contact and engage a stationary contact 88. As seen from FIG. 1, the movable contact 82 is grounded as at 123.

Further referring to FIG. 1, it will be seen that when the coil 56 is energized, and the movable contact 82 is in contact with stationary contact 84, a circuit will be completed to the electromagnetic coil 92 of a controller 94 through the following circuit: battery 20, wire 24, switch 28, wire 34, switch 38, wires 44 and 96, coil 92, wire 98, switch contacts 68 and 64 of the controller 58, wire 100, stationary contact 86 and the steering wheel movable contact 82 to ground connection 123. The controller 94 includes switch means including two switches which are normally biased to an open position by any suitable means. The switches include two movable contacts 104 and 106, which, upon being actuated by the coil 92 are brought into contact with stationary contacts 108 and 110, respectively. Upon energization of the coil 92, a holding circuit will be energized for that coil, as follows: battery 20, wire 24, switch 28, wire 34, switch 38, wires 44, 96 coil 92 wires 98 and 112, contacts 108 and 104 to ground connection 113.

Upon return of the steering wheel movable contact 82 to contact 84, a circuit will be established to an electromagnetic coil 114 of a controller 116, which includes the contacts 26 and 30. This circuit is traced as follows: battery 20, wire 24, switch 28, wire 34, switch 38, wires 44, 96 and 118, contacts 110 and 106 of controller 94, wire 112, coil 114, wire 122, contacts 84 and 82, to ground connection 123. When this circuit is closed, contact 30 is separated from contact 26, whereby the holding circuit to the coil 56 of controller 58 will be interrupted with consequent interruption of the circuit to lamps 72.

When a left turn is anticipated, the driver will move contact 48 of switch 46 into engagement with contact 52 to establish a circuit to an electromagnetic coil 124 of a controller 126 which is traced as follows: battery 20, wire 24, switch 28, wire 30, switch 38, wire 44, contacts 48 and 52, wire 128, coil 124 to ground connection 130. The energization of coil 124 effects closing of switch means, comprising stationary contacts 132 and 134 and movable contacts 136 and 138. The closing of contact 136 onto contact 132 closes a holding circuit for coil 124, which is traced as follows: battery 20, wire 24, switch 28, wire 34, switch 38, wires 44, 69 and 140, contacts 132 and 136, wire 142, coil 124 and ground connection 130.

The closing of contact 138 on contact 134 establishes the following circuit to a series of lamps, one of which is shown at 144: battery 20, wire 24, switch 28, wire 34, switch 38, wires 44, 69 and 140, contacts 132 and 136, wire 146, flasher 148, lamps 144 to ground connection 150

Also, the closing of contact 138 on contact 134 and the closing of steering wheel contact 82 on contact 88, establishes a circuit to coil 92 of controller 94, as follows: battery 20, wire 24, switch 26, wire 34, switch 38, wires 44 and 96, coil 92, wires 98 and 152, contacts 134 and 136, wire 154, stationary contact 88 of the steering wheel actuated switch, movable contact 82 to ground connection 123.

Again, upon closing of the circuit through the coil 92 of controller 94, the aforesaid holding circuit will be established through contacts 106 and 110 of the controller 94, and, the circuit through coil 114 of controller 116 will be conditioned for operation, and will be effective upon the closing of contact 82 of the steering actuated switch on contact 84. The circuit for coil 114 is as was heretofore traced. Therefore, after the left turn is negotiated, coil 114 will open switch 28 to interrupt the holding circuit to coil 124 of controller 126 to interrupt the circuit to the series of lamps 144.

Should it be desirable to simultaneously provide flashing of both sets of lights 72 and 144, manually actuated contact 48 will be moved, for example to the right to effect energization of coil 56 of controller 58 and then to the left to effect energization of coil 124 of controller 126. Both holding circuits of these two coils will follow the respective energization of those coils. At that time, the circuit to coil 114 of controller 116 must be rendered ineffective, as for example, by moving the steering wheel actuated switch contact 82 away from contact 84.

Should the driver reconsider and decide not to negotiate the turn after moving the contact 48 onto either contact 50 or 52, the holding circuits, then effective, can be rendered ineffective by manually opening switch 38.

From the foregoing, it is apparent that by practicing the present invention, the signal lamps are disconnected automatically after the turn of the vehicle is negotiated. Also, all signal lamps can be rendered effective simultaneously so that flashing takes place along both sides of the vehicle.

While the form of embodiment herein shown and described constitutes preferred form, it is to be understood that other forms may be adopted.

We claim:

1. A direction signalling system for a vehicle having a source of current, said system comprising in combination:
   A. A controller including:
      1. an electromagnetic coil;
      2. switch means controlled by the coil;
   B. a circuit including: said source of current, and:
      1. a switch normally biased to a closed position;
      2. a manually controllable signal switch, and the electromagnetic coil;
   C. a holding circuit for the coil including: said source of current, said switch (B) (1), said coil and said switch means of the controller;
   D. a signal lamp;
   E. a circuit for the signal lamp effective when said coil is energized, including said source of current, said switch (B) (1), said switch means of the controller and the lamp;
   F. a second controller including:
      1. an electromagnetic coil;
      2. switch means controlled by said second mentioned coil (F) (1);
   G. a steering wheel;
   H. a steering wheel actuated switch including:
      1. a contact movable with the rotation of the steering wheel;
      2. a centrally disposed stationary contact disposed to be engaged by the movable contact (H) (1) when the steering wheel is in the position of guiding the vehicle forwardly;
      3. a second stationary contact disposed to be engaged by the movable contact (H) (1) when the steering wheel is oscillated to negotiate a turn of the vehicle;
   I. a circuit for the second mentioned coil (F) (1), including: the source of current, said switch (B) (1) which is normally biased to closed position, said second mentioned coil (F) (1), the switch means of the first mentioned controller and the second mentioned stationary contact of the steering wheel actuated switch;
   J. a holding circuit for the second mentioned coil (F) (1), including: said source of current, said switch (B) (1), said second mentioned coil, the switch means of the second mentioned controller;
   K. a third controller including:
      1. an electromagnetic coil and said switch (B) (1) which is normally biased to a closed position;
   L. a circuit for the third mentioned controller including: said source of current, switch (B) (1), the switch means of the second mentioned controller, said third mentioned coil, said centrally disposed stationary contact (H) (2) and the movable contact of the steering wheel actuated switch.

2. A system as defined in claim 1, characterized to include:
   M. A manually actuated switch in the first mentioned circuit (B).

3. A system as defined in claim 1, characterized to include:
   M. A flasher in series circuit relationship with the signal lamp.

4. A system as defined in claim 1, characterized to include:
   M. A manually actuated switch in the first mentioned circuit (B);
   N. a flasher in series circuit relationship with the signal lamp.

5. A system as defined in claim 1, characterized in that second mentioned stationary contact (H) (3), of the steering wheel actuated switch is disposed to one side of the centrally disposed stationary contact, and that said steering wheel actuated switch includes:
   H. 4. a third stationary contact disposed on the opposite side of the centrally disposed stationary contact (H) (2);
   and further characterized in that manually closable signal switch (B) (2) is movable from the first mentioned circuit closing position to a second position;
   M. a fourth controller including:
      1. an electromagnetic coil;
      2. switch means controlled by the fourth mentioned coil;
   N. a circuit including: said said source of current, said switch (B) (1), which is normally biased to a closed position, said manually closable switch (B) (2) when in the second mentioned position, said fourth mentioned electromagnetic coil (L) (1);
   O. a holding circuit for the fourth mentioned coil including: said source of current, said switch (B) (1), said fourth mentioned coil and the switch means of the fourth mentioned controller;
   P. a second signal lamp;
   Q. a circuit for the signal lamp when the fourth mentioned coil is energized, including: said source of current, said switch (B) (1), the switch means of the fourth mentioned controller and the second mentioned lamp;
   R. a circuit including said source of current, said switch (B) (1), said second mentioned coil (F) (1); the third mentioned stationary contact (H) (4) of the steering wheel actuated switch and the movable contact of the latter switch.

6. A system as defined in claim 5, characterized in that the circuits for the first and fourth mentioned coils include a common conductor, and further characterized to include:
   S. A manually actuated switch in the common conductor.

7. A system as defined in claim 5, characterized in that the second mentioned lamp circuit includes:
   S. A flasher.

8. A system as defined in claim 5, characterized in that the circuits for the first and fourth mentioned coils include a common conductor, and further characterized to include:
   S. A manually actuated switch in the common conductor;
   and further characterized in that the second mentioned lamp circuit includes:
   T. a flasher in said common conductor.